July 17, 1962  B. TEBB ETAL  3,044,074
BELT LACING MACHINES

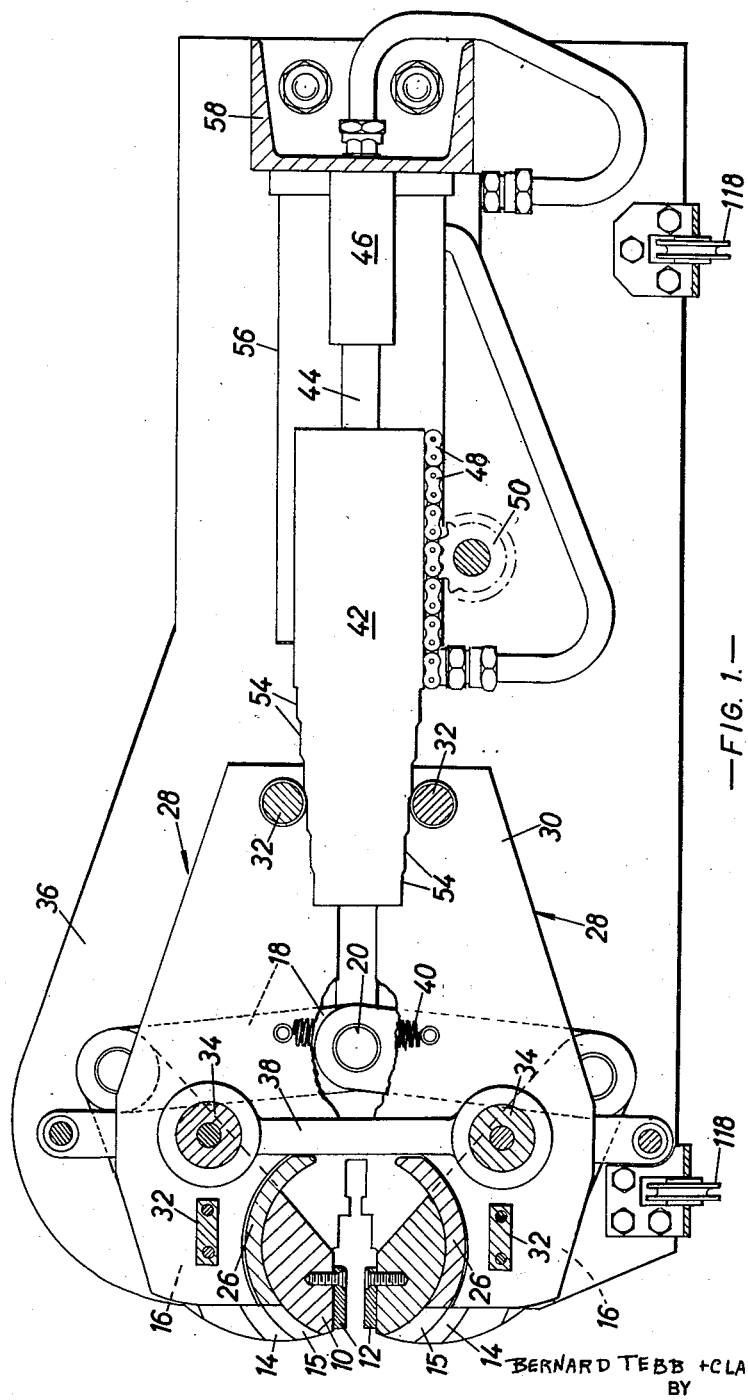

Filed July 1, 1960  8 Sheets-Sheet 2

INVENTORS:
BERNARD TEBB
CLARENCE H. PERRY
BY
ATTORNEYS.

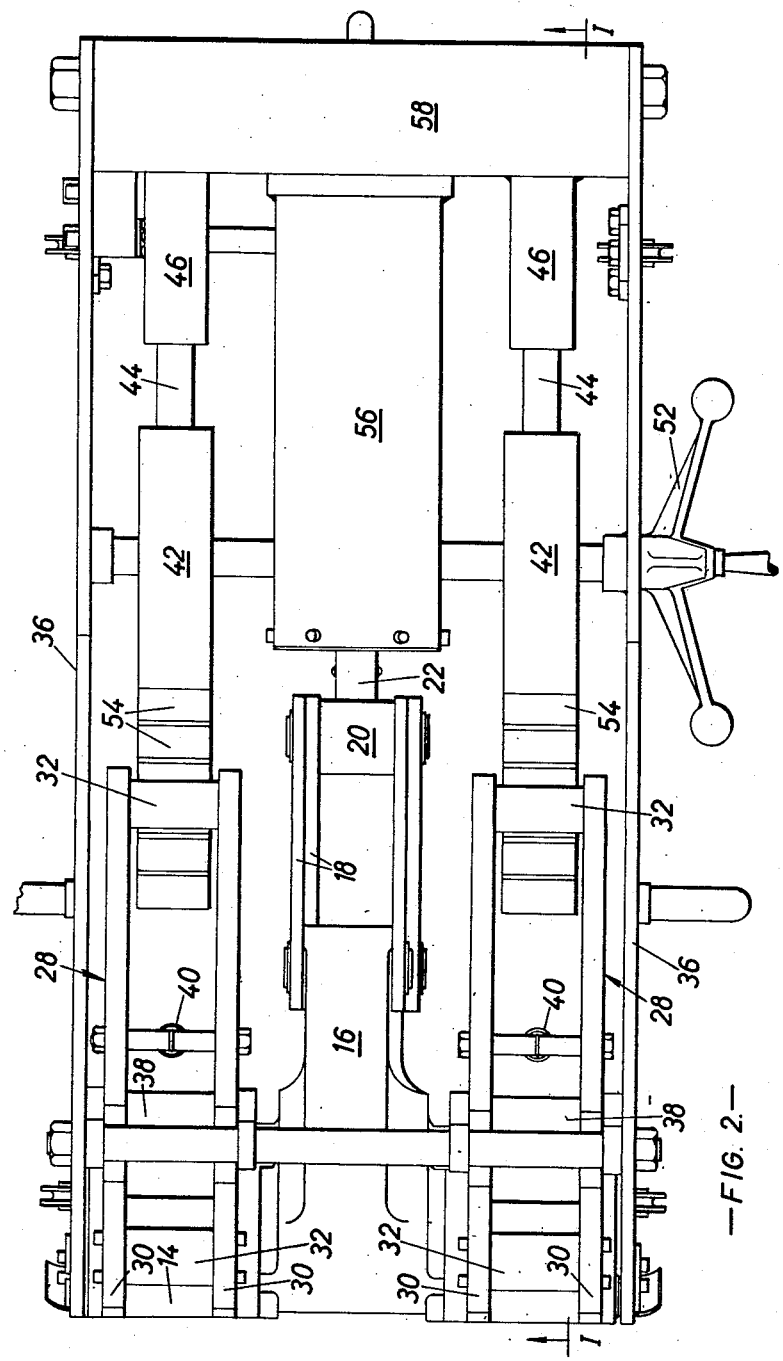

July 17, 1962 B. TEBB ETAL 3,044,074
BELT LACING MACHINES
Filed July 1, 1960 8 Sheets-Sheet 4

INVENTORS
BERNARD TEBB + CLARENCE H. PERRY
BY
Mead, Browne, Schuyler - Beveridge

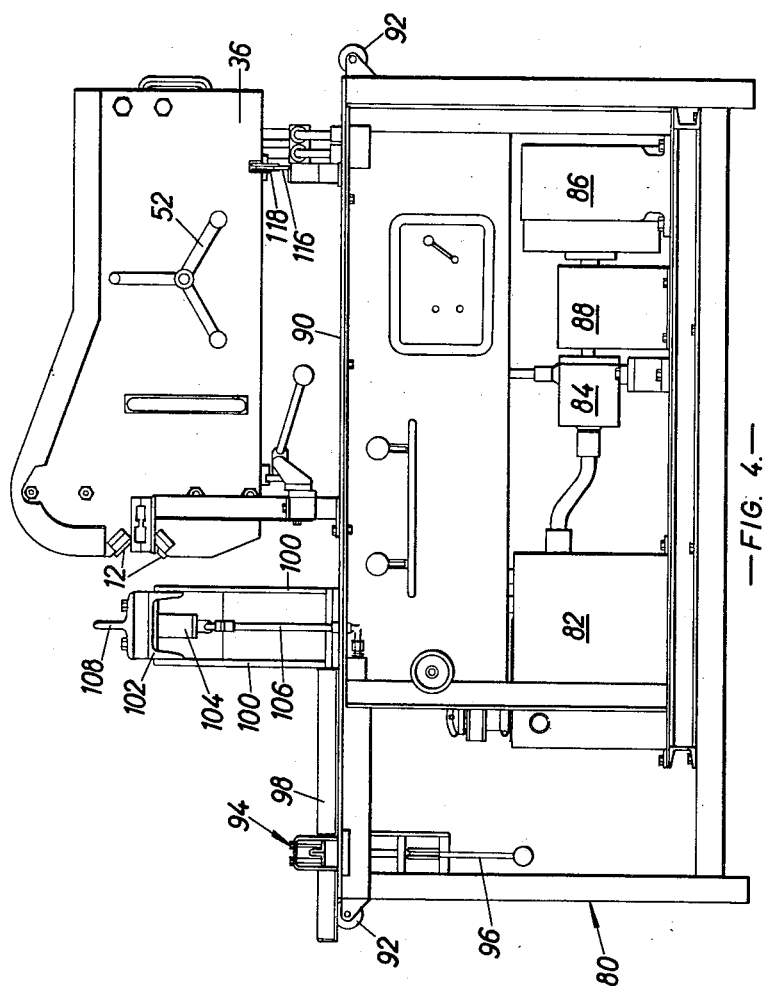

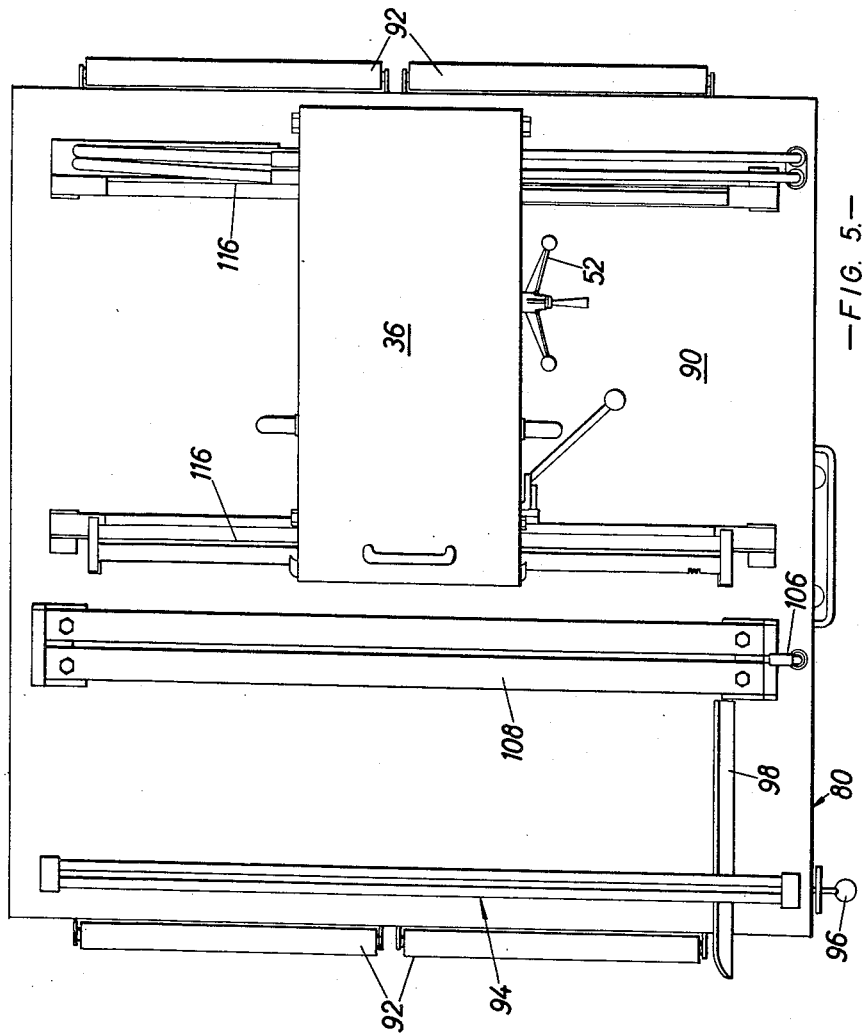

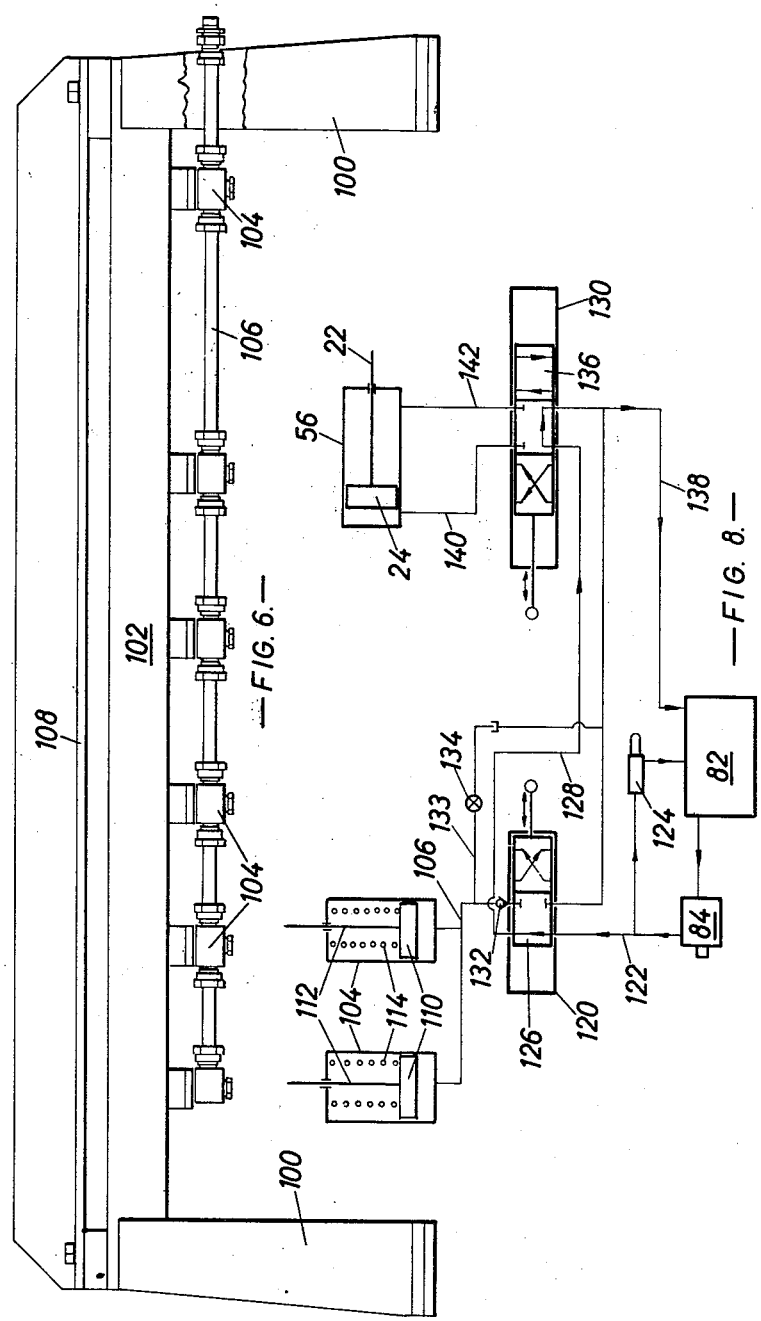

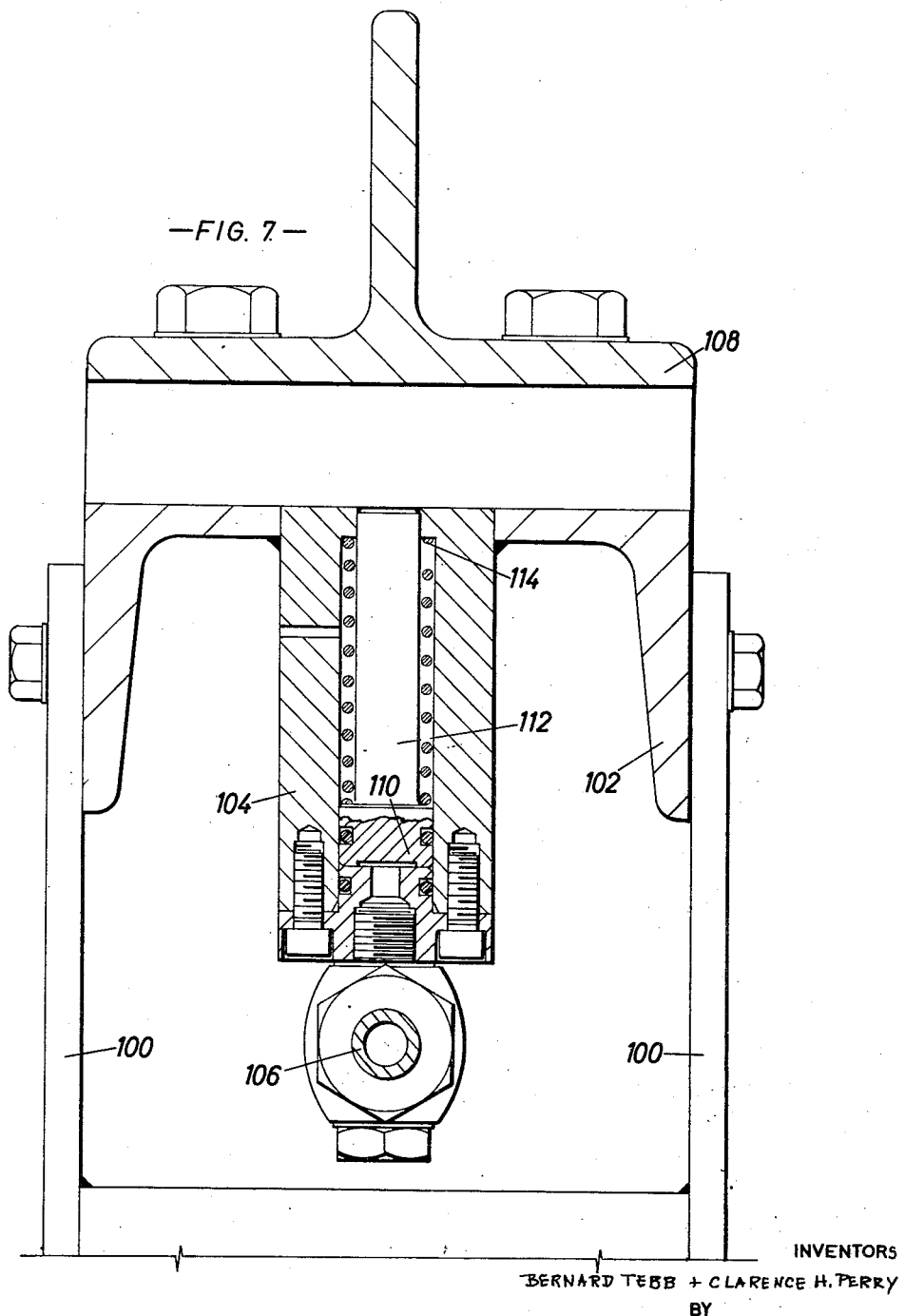

3,044,074
BELT LACING MACHINES

Bernard Tebb, Swanland, and Clarence Herbert Perry, Hull, England, assignors to Mastabar Mining Equipment Company Limited, Hull, England, a British company
Filed July 1, 1960, Ser. No. 40,324
Claims priority, application Great Britain July 8, 1959
5 Claims. (Cl. 1—342)

This invention concerns belt lacing machines, that is to say, machines for inserting generally U-shaped wire hook fasteners into the end of a belt to present a series of loops extending from the belt and to enable said end to be connected to another similarly provided belt and by means of a connecting pin, and thereby form a pivotal joint.

The most widely used type of belt lacing machine for use on conveyor belts and power transmission belts has a pair of jaws operable by cams or levers to open and close, and in closing, to force the pointed ends of the wire hook fasteners into the belt. The operation of the jaws, however, is effected manually, and whilst this is convenient for many circumstances in which such machines are used it does limit the size of fastener which can be dealt with, inter alia because the degree of pressure which can be exerted by the jaws is limited, and it can render the lacing operation difficult under the confined conditions which often prevail, for example, at a coal face. In the mining industry, considerations such as those mentioned above, together with the growing tendency to use wider belts for conveying purposes, have led to the practice of conducting belt jointing operations in workshops above rather than below ground, where restrictions on the size of belt lacing machines and the necessity for manual operation thereof no longer apply.

The present invention seeks to provide a belt lacing machine which is intended primarily, although not exclusively, for use in such workshops, and which will enable even the widest belts currently coming into use to be jointed quickly and simply.

According to the present invention, a hydraulically power-operated belt lacing machine having a pair of jaws movable towards and away from one another by means of a cam or lever system or the like mechanical jaw-operating means includes a hydraulic ram displaceable in a hydraulic cylinder and coupled to said jaw-operating means, and a hydraulic medium flow control valve adapted, during jaw closing movements of said ram to be opened to permit free flow of hydraulic medium from one side of said ram to the other side thereof at or towards the end of the jaw closing stroke.

In order to enable the machine to accommodate belts of different thicknesses, the invention further provides for the jaws, bearings which are displaceable towards and away from one another so as to determine the minimum spacing between the jaws in the fully closed position. In the preferred arrangement, these bearings are arranged at the forward end regions of pivotal levers, the rear ends of which rest on either side of a wedge member, so that by displacement of the wedge member, the spacing between the forward end regions of the levers and hence between the jaws can be varied.

The invention will be described further, by way of example, with reference to the accompanying drawings, in which:

FIG. 1 is a sectional side elevation, taken on the line I—I of FIG. 2, of a belt lacing machine embodying the invention;

FIG. 1a is an elevation similar to that of FIG. 1 but showing the jaws of the lacing machine in an open, belt receiving position;

FIG. 2 is a plan view of the belt lacing machine of FIG. 1;

FIG. 2a is a vertical section taken on the line II—II of FIG. 1a;

FIG. 4 is a side elevation of a belt joining apparatus incorporating the belt lacing machine of FIGS. 1 to 3;

FIG. 5 is a plan view of the belt joining apparatus of FIG. 4;

FIG. 6 is a front elevation of a belt clamping device employed in the apparatus of FIGS. 4 and 5;

FIG. 7 is an enlarged sectional detail of a part of the belt clamping device of FIG. 6; and FIG. 8 is a schematic diagram of the hydraulic circuit employed to operate the belt jointing apparatus.

Figures 1A, 2A:
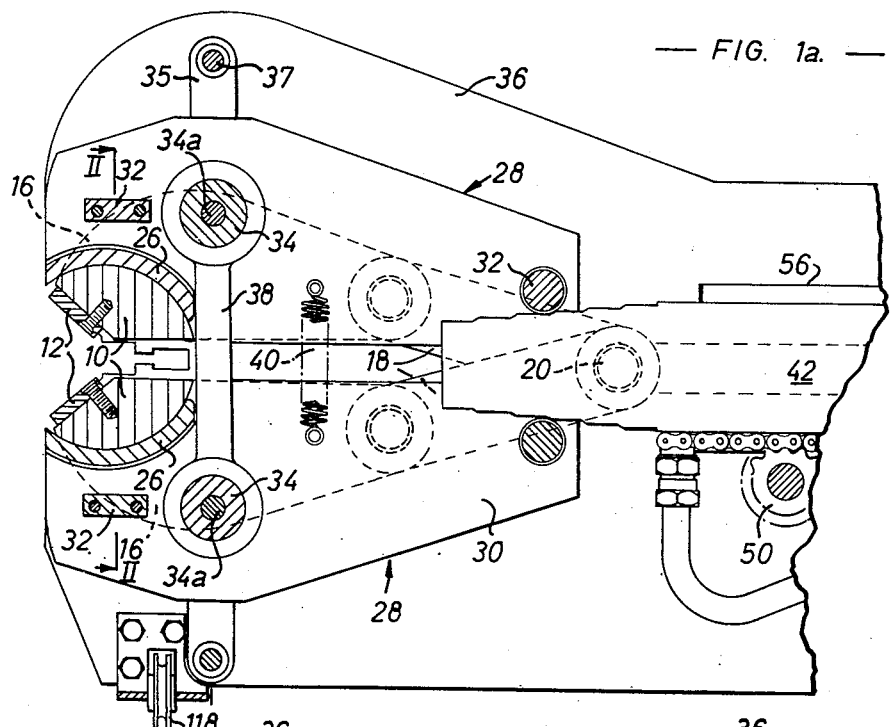

In the belt lacing machine itself, as shown in FIGS. 1 and 2, jaws 10 having inner jaw plates 12 for engaging wire hook fasteners and overhanging arcuate shoulders 14 co-operating with the jaws 10 to define a bearing groove 15 are each formed integrally with a rearwardly extending lever 16 which at its free end is pivotally connected to a further lever 18 to form a toggle lever system for effecting opening and closing movements of the jaws. For this purpose, the free ends of levers 18 are pivotally connected by means of a pin 20 to which is also pivotally secured a connecting rod 22 of a hydraulic ram 24, the ram 24 being hereinafter more fully described with reference to FIG. 3.

The outer cylindrical bearing surfaces of the jaws 10 together with the grooves 15 co-operate with arcuate bearings 26 carried in bearing members generally designated 28. The bearing members 28 are four in number, arranged one at each end region of each jaw 10, and each comprises a pair of plates 30 held in spaced, parallel relation by means of distance pieces 32 secured therebetween. A bush 34 is also mounted between each pair of bearing plates 30, by means of which each bearing member 28 is pivotally secured to the outer casing 36 of the machine, and to impart additional strength when the bearing members provide the reaction to the load exerted by the jaws on a wire hook fastener unit, a stay 38 is arranged between the bushes 34 of the upper and lower bearing members at each end of the jaws.

The casing 36 is carried on a framework comprising tie bars 35 and lateral spaces 37 (FIGS. 1a and 2a) and in the tie bars 35 are located bolts 34a carrying the bushes 34 on which are engaged the stays 38. Nuts 34b engaged on the bolts 34a hold the plates 30 and bushes 34 of bearing members 28 in assembled relation, and the bushes 34 form the pivots for the bearing members 28.

In each pair of bearing members consisting of the upper and lower bearing members 28 at each end of the jaws 10, it will be seen from FIG. 1 that the said upper and lower members are connected, behind the pivotal bushes 34, by means of a spring 40 which acts to hold the rear distance pieces 32 against a wedge-like support 42. Each support 42 is carried on a spindle 44 slidably received in a guide 46, and has mounted on its bottom face, a series of chain links 48 which are engageable by a sprocket 50 adapted for manual rotation from externally of the machine by means of a hand wheel 52. In this way, the rear distance pieces 32 of the bearing members 28 can be caused to seat on desired ones of a plurality of stepped abutment surfaces 54 of the wedge-like support 42, whereby the bearing members 28 are rocked about their pivotal points or bushes 34 and in turn vary the distance of closest approach between the jaw plates 12 by varying the distance apart of the bearings 26.

Figure 3:
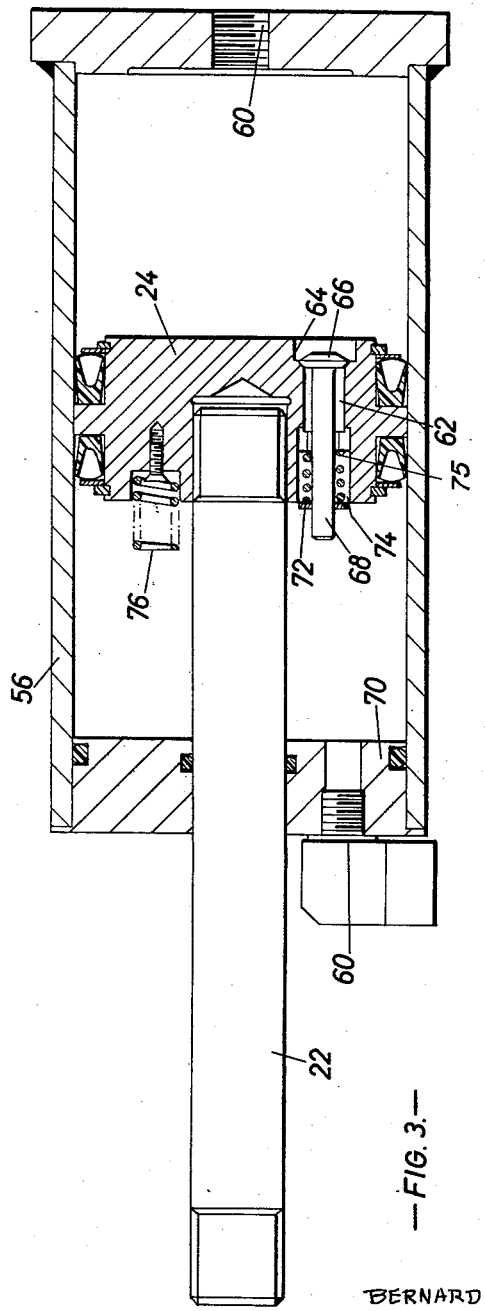
FIG. 3 is an axial section through the cylinder and ram of the jaw-operating mechanism.

Referring now to FIG. 3, the ram 24 is housed in a cylinder 56 mounted at one end on a channel member 58 extending transversely across the rear end of the casing 36, and serving also to support the wedge guides 46. The cylinder 56 has connections 60 for the supply and exhaust of hydraulic medium to and from either side of the ram 24, and the action of the ram is such that, when it moves to the left as viewed in FIG. 3, the pivotal points between the pairs of levers 16 and 18 separate, thus causing the levers 16 to close the jaws, while in the opposite direction of movement of the ram, the reverse movement of the levers 16, 18 takes place and the jaws are caused to open.

Since the hydraulic medium employed to displace the ram in the jaw-closing direction is supplied to the cylinder 56 at a relatively high pressure, for example of the order of 1200 p.s.i., it is desirable that such pressure shall be removed from the ram as soon as the jaws have closed to their fullest extent, in order thereby to avoid any possibility of damage either to the ram, or to the cylinder. The ram 24 is accordingly formed with a bore 62 which is counterbored at 64 on the side of the ram remote from the connecting rod 22, to provide a valve seat for a poppet valve member 66, and a valve stem 68 of the valve member 66 projects from the opposite face of the ram to constitute a striker adapted to abut against the left-hand closure plate 70 of cylinder 56 when the ram 24 reaches the end of its stroke and the jaws are closed. The valve stem 68 carries a fixed washer 72, and the bore 62 is formed with a further counterbore 74 which receives a compression spring 75 bearing against the washer 72 so as to resiliently urge the valve member 66 towards its seat. Thus, when the ram reaches the end of its jaw-closing stroke, the valve member 66 is lifted from its seat by the valve stem 68, and opens the bore 62 to permit free flow of the hydraulic medium through the ram and thereby effectively remove the hydraulic pressure from said ram. Moreover, the spring 74 is so dimensioned that, when hydraulic medium under pressure is supplied to the other side of the ram 24 to restore said ram and open the jaws 10, the poppet valve member 66 is unseated by the hydraulic pressure to an extent sufficient to allow a restricted flow of hydraulic medium through the bore 62 and hence reduce the effective value of pressure applied to the ram. It will be noted that, as a precaution, return start springs 76 are secured to the ram 24 on the same side thereof as the connecting rod 22 to impart an initial return movement to the ram 24 and overcome any tendency of the ram to lock in position in the cylinder 56 should the levers 16 and 18 approach a dead-centre condition.

The belt lacing machine described above is suitable for use in any situation where a supply of hydraulic medium at an appropriate pressure is already available. However, the invention further includes a complete belt jointing apparatus as shown more particularly in FIGS. 4 and 5, which incorporates its own integral hydraulic power supply. In the apparatus of FIGS. 4 and 5, the belt lacing machine will be seen to be mounted on a table generally designated 80 and which provides a mounting for a reservoir 82 for hydraulic medium, a pump 84 for supplying hydraulic medium under pressure from the reservoir 82 to the component parts of the apparatus, an electric motor 86 for driving the pump, and a mechanical coupling 88 arranged between the pump and the motor. The table 80 has a working surface 90, somewhat above which the lacing machine is mounted, and rollers 92 are provided at each end of the working surface to facilitate the feeding on and off of a belt to be jointed. Towards the front end of the working surface is secured a cutting device generally indicated at 94, and which is of conventional constructoin having a belt clamp (not shown in detail but operable by means of a handle 96) and a knife (not shown) which can be drawn across the full width of the clamp to sever a belt therein. With the clamp 94 there is associated a guide 98 for enabling the belt to be squared up before cutting.

Immediately in front of the belt lacing machine, there is mounted on the working surface 90 of the table, and at a level corresponding to that of the gap between the jaws 10, a hydraulically operated belt clamping device which is employed to hold the belt firmly during the insertion of wire hook fastener units therein. This hydraulic belt clamping device is more fully illustrated in FIGS. 6 and 7, and will be seen to comprise at each of its ends, a pair of spaced pillars 100 between which is secured an inverted channel member 102 having a plurality of hydraulic cylinders 104 depending at intervals therefrom and serially connected by a feed pipe 106 for hydraulic medium. Secured above the channel member 104 is a top plate 108 which is spaced from the member 104 a distance sufficient to accommodate the maximum thickness of belt with which the lacing machine is equipped to deal. Each of the cylinders 104 has a piston 110 slidably arranged therein (FIG. 7) and having a piston rod 112 extending upwardly through the cylinder so as to be capable of entering the space between the channel member 102 and the top plate 108. A spring 114 is arranged on the piston rod 112 to bear at one end against the cylinder end closure plate and at the other end against the piston in order to urge the piston resiliently downwards in the cylinder. Thus, when a belt end has been positioned in the space between the member 102 and the top plate 108 and hydraulic medium is supplied to the cylinders 104 through the pipe 106, the pistons are displaced upwardly in their cylinders and cause the piston rods to clamp their cylinders and cause the piston rods to clamp the belt end securely against the top plate.

In the operation of the belt lacing apparatus provided by the invention, a required length of belting having been cut in the cutting device 94, the cut end region is positioned in the hydraulic clamping device 100–114 with the extreme end located between the jaws 10 of the lacing machine. Hydraulic medium under pressure is then supplied from the pump 84 firstly to the hydraulic clamping device to cause the belt end to be gripped by the piston rods 112, and then to the lacing machine to cause wire fasteners previously arranged therein to be inserted into the belt end. If the belt is wider than the jaws 10, the lacing machine, having first inserted fasteners into one side of the belt, is then moved along rails 116 (FIG. 5) on which it is mounted by means of wheels 118 (FIGS. 1 and 4) to a second, and if necessary to a third position transversely of the belt, the jaws 10 being opened after each insertion operation. When the whole width of the belt has been provided with the required number of fasteners, the hydraulic pressure is removed firstly from the lacing machine and then from the hydraulic clamping device to enable the belt to be taken out therefrom and passed along the working surface 90 of the table for feeding out of the rear end of said surface.

FIG. 8 shows the hydraulic circuit by means of which the foregoing operations are effected. The pump 84 draws hydraulic medium from the reservoir 82 and delivers it via a pipe line 122 to a clamp control valve 120 for controlling operation of the hydraulic clamping device 100–114. A pressure relief valve or blow-off valve 124 is connected between the pump delivery line 122 and the reservoir 82 to ensure that the hydraulic medium is delivered to the clamp control valve 120 at a constant pressure. The clamp control valve 120 has a two-position valve member 126 which, in one end position, which is its normal or rest position, as shown in the drawing, connects the pump delivery line 122 via a pipe line 128 to a further control valve 130 for controlling the closing or clenching movement of the jaws 10 of the belt lacing machine. In the other end position of the valve member 126, the pump delivery line 122 is connected to the line 106 for supplying hydraulic medium under pressure to the hydraulic cylinders 104 of the belt clamping device. It will be noted that a non-return valve 132 is connected in the pipe line 106 to prevent return flow of hydraulic medium to the control valve 120 even when the valve member 126 is subsequently returned to its normal or rest position. Thus hydraulic medium can only be returned from the cylinders 104 to the reservoir 82 by way of a further pipe line 133, which incorporates a shut-off valve 134. Therefore, if the shut-off valve 134 is closed before the clamping device is operated, the belt end will remain gripped even after the valve member 126 has been returned to its normal position, and will not be released until the shut-off valve 134 is opened.

The clench control valve 130 for the belt lacing machine has a valve member 136 which is capable of occupying a central normal or rest position, as shown in the drawing, or either of two end positions, one on either side of the rest position. In the normal or rest position of the valve member 136, the hydraulic medium under pressure which is delivered to the valve 130 by way of the pipe line 128 is transferred to a pipe line 138 by which it is returned to the reservoir 82. In the left-hand end position, as viewed in FIG. 8, the hydraulic medium from pipe line 128 is delivered by the valve member 136 to a pipe line 140 and hence to the front face of the ram 24 (i.e. the left-hand face of the ram 24 in FIG. 8) to cause the connecting rod 22 to extend out of the cylinder 56 and effect closing or clenching of the jaws 10. When the ram 24 reaches the end of its stroke in the cylinder 56 and the valve member 66 of FIG. 3 opens the bore 62 in the ram, the hydraulic medium then passing through the ram flows out of the cylinder 56, behind the ram, and through a pipe line 142 which returns said medium through the valve member 136 to the pipe line 138 and from there to the reservoir 82. In the right-hand end position of the valve member 136, the hydraulic medium under pressure is delivered by the pipe line 128 to the pipe line 142 and the rear face of the ram 24 to restore the ram to its non-operated position and hence open the jaws 10. Hydraulic medium from the other side of the ram, and which passes through the bore 62 in the ram when the valve member 66 therein is lifted by hydraulic pressure, then returns to the reservoir 82 through pipe line 140, the valve member 136 and pipe line 138.

We claim:

1. A belt lacing machine comprising a frame, a pair of spaced, opposed lever means pivotally secured intermediate their ends to said frame, bearing means at the forward end of each lever means, a jaw carried by said bearing means at said forward end of each lever means, at least one generally wedge-shaped member between said opposed lever means at the rear ends thereof, said wedge member constituting a support for said rear ends, means for displacing said wedge member to vary the spacing of said rear ends and thereby vary the minimum spacing of said jaws consequent upon alteration of the spacing between the bearing means at the forward ends of said lever means, jaw-operating means for displacing said jaws in said bearing means to selectively open and close said jaws, a hydraulic cylinder, passage means at each end of said cylinder for admitting hydraulic medium thereto, a hydraulic ram slidable in said cylinder responsive to the admission of hydraulic medium thereto, means connecting said ram to said jaw-operating means for actuating said jaw-operating means responsive to displacement of said ram by said hydraulic medium, and hydraulic by-pass means operable to open a free flow path to hydraulic medium from one side of said ram to the other side thereof responsive to movement of said ram into a position in said cylinder approaching a jaw-closed condition.

2. A belt lacing machine as set forth in claim 1, further comprising fixed guide means secured to said frame, said guide means carrying said wedge member and determining the direction of displacement thereof, and wherein said displacing means comprise a manually rotatable sprocket member mounted in said frame and chain link means carried by said wedge member for engagement by said sprocket.

3. A belt lacing machine comprising a frame, a pair of jaw members, a toggle linkage for moving at least one of said jaw members toward the other of said jaw members, a lever pivoted intermediate its ends on said frame, a bearing member on one end of said lever cooperatively associated with one of said jaw members, and means for moving the other end of said lever to vary the distance between said jaws independently of said toggle linkage.

4. A belt lacing machine as defined in claim 3 wherein said means for moving the other end of said lever comprises a wedge member reciprocably supported on said frame and gear means between said wedge member and said frame for reciprocating said wedge member.

5. A belt lacing machine comprising a frame, a pair of jaw members, a toggle linkage for moving said jaw members towards and away from each other including a hydraulic ram for actuating said toggle linkage, a pair of levers, each lever being pivotally mounted intermediate its ends on said frame, a bearing member on one end of each of said levers, respectively, each bearing member being cooperatively associated with one of said jaw members, and wedge means for moving the other ends of said levers about the lever pivots to vary the distance between said jaws independently of said toggle linkage.

References Cited in the file of this patent

UNITED STATES PATENTS

| 1,619,137 | Knott | Mar. 1, 1937 |
| 2,261,444 | Neubert | Nov. 4, 1941 |
| 2,908,009 | Potter | Oct. 13, 1959 |

FOREIGN PATENTS

| 107,153 | Australia | Apr. 11, 1939 |
| 799,409 | Great Britain | Aug. 6, 1958 |